United States Patent
Balebail

(10) Patent No.: US 8,204,892 B2
(45) Date of Patent: Jun. 19, 2012

(54) PERFORMANCE BOOST FOR SORT OPERATIONS

(75) Inventor: Vijay Balebail, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 216 days.

(21) Appl. No.: 12/606,109

(22) Filed: Oct. 26, 2009

(65) Prior Publication Data
US 2011/0099179 A1    Apr. 28, 2011

(51) Int. Cl.
*G06F 17/30*    (2006.01)

(52) U.S. Cl. ........................................ 707/752; 707/812

(58) Field of Classification Search .................. 707/752, 707/753, 754, 812
See application file for complete search history.

(56) References Cited

U.S. PATENT DOCUMENTS

| | | | |
|---|---|---|---|
| 5,487,164 A * | 1/1996 | Kirchhofer et al. ................... 1/1 |
| 5,551,018 A * | 8/1996 | Hansen ................................. 1/1 |
| 6,886,084 B2 | 4/2005 | Kawashima et al. |
| 7,228,354 B2 | 6/2007 | Chambliss et al. |
| 7,370,068 B1 * | 5/2008 | Pham et al. ............................ 1/1 |
| 7,454,420 B2 * | 11/2008 | Ray et al. .............................. 1/1 |
| 7,689,623 B1 * | 3/2010 | Liu ................................. 707/752 |
| 7,761,425 B1 * | 7/2010 | Erickson et al. ............. 707/649 |
| 7,895,216 B2 * | 2/2011 | Longshaw et al. ............ 707/752 |
| 8,001,134 B2 * | 8/2011 | Liu ............................... 707/752 |
| 2002/0033762 A1 * | 3/2002 | Belu ............................... 341/87 |
| 2003/0172059 A1 * | 9/2003 | Andrei ............................... 707/3 |
| 2003/0217071 A1 * | 11/2003 | Kobayashi et al. ........... 707/102 |
| 2004/0193570 A1 * | 9/2004 | Yaeger ................................. 707/1 |
| 2005/0050083 A1 * | 3/2005 | Jin et al. ......................... 707/102 |
| 2006/0101086 A1 * | 5/2006 | Ray et al. ........................ 707/200 |
| 2007/0239680 A1 * | 10/2007 | Oztekin et al. ..................... 707/3 |
| 2008/0016074 A1 * | 1/2008 | Ben-dyke et al. ................. 707/7 |
| 2008/0104283 A1 | 5/2008 | Shin et al. |
| 2008/0208861 A1 * | 8/2008 | Ray et al. ........................... 707/7 |
| 2008/0244209 A1 | 10/2008 | Seelam et al. |
| 2009/0024384 A1 * | 1/2009 | Kobayashi et al. ............... 704/8 |
| 2009/0034377 A1 * | 2/2009 | English et al. ............. 369/47.13 |
| 2009/0063591 A1 * | 3/2009 | Betten et al. ................... 707/205 |

(Continued)

OTHER PUBLICATIONS

Oracle Corporation, Ronald Weiss, "A Technical Overview of the HP Oracle Exadata Storage Server," May 13, 2009, An Oracle White Paper, 24 pages.

(Continued)

*Primary Examiner* — Thanh-Ha Dang
(74) *Attorney, Agent, or Firm* — Hickman Palermo Truong Becker Bingham Wong LLP; Eric L. Sutton

(57) ABSTRACT

A method, computer-readable medium, and machine are provided for boosting the performance of sort operations. A database server performs an operation on a set of data. The operation uses disk space such as a temporary tablespace. The disk space belongs to a disk group in which data is stored according to a level of redundancy. A determination is made as to whether the operation is a sort operation. If the operation is not a sort operation, then at least part of a result of the operation is stored on the disk space according to the level of redundancy specified for the disk group. If the operation is a sort operation, then only a single copy of the at least part of the result is stored without storing a redundant copy of the at least part of the result. Optionally, backup information sufficient to re-perform the sort operation may also be stored.

20 Claims, 3 Drawing Sheets

U.S. PATENT DOCUMENTS

| | | | |
|---|---|---|---|
| 2009/0119295 A1* | 5/2009 | Chou et al. | 707/7 |
| 2010/0077107 A1 | 3/2010 | Lee et al. | |
| 2010/0082648 A1 | 4/2010 | Potapov et al. | |
| 2010/0191717 A1* | 7/2010 | Graefe | 707/713 |
| 2010/0191749 A1* | 7/2010 | Liu | 707/752 |
| 2010/0211577 A1* | 8/2010 | Shimizu et al. | 707/752 |
| 2011/0055232 A1* | 3/2011 | Graefe | 707/752 |
| 2011/0302178 A1* | 12/2011 | Liu | 707/752 |

OTHER PUBLICATIONS

IBM TDB, "A Scheduling Algorithm for Processing Mutually Exclusive Workloads in a multi-system Configuration", ip.com dated Aug. 19, 2002 (3 pages).

U.S. Appl. No. 12/563,073, filed Sep. 18, 2009, Notice of Allowance, Dec. 27, 2011.

* cited by examiner

PERFORMANCE BOOST FOR SORT OPERATIONS

FIELD OF THE INVENTION

The present invention relates to data redundancy.

BACKGROUND

A database comprises data and metadata that is stored on one or more storage devices, such as a set of hard disks. Such data and metadata may be stored in a database logically, for example, according to relational and/or object-relational database constructs. Database applications interact with a database server by submitting to the database server commands that cause the database server to perform operations on data stored in a database. A database server is a combination of integrated software components and an allocation of computational resources, such as memory, a computing device, and processes on the computing device for executing the integrated software components on a processor, the combination of the software and computational resources being dedicated to performing a particular function to process requests to access a database. A database command is a request to access data from a database. The command may be to perform operations on the data in the database or return the data from the database. Database commands may be in the form of a database statement. For the database server to process the database statements, the database statements supplied to the database server are statements that conform to a database language supported by the database server. One non-limiting database language supported by many database servers is SQL, including proprietary forms of SQL supported by such database servers as Oracle, (e.g. Oracle Database 10 g).

Data is typically stored according to redundancy settings for collections of physical disks called disk groups. If the disk group stores data with normal redundancy, for example, then two copies of the data are maintained, or mirrored, among at least two failure groups. A failure group is one or more disks of a disk group that share a common resource. In other words, disk groups are organized into failure groups such that a failure of one resource, such as a disk controller, can only cause a failure of one failure group. A high redundancy disk group maintains multiple mirrored copies of the data in multiple failure groups, such as two, three or more. A no redundancy disk group maintains only a single copy of the data with no mirroring, and that single copy may be maintained in one or more failure groups. Some disk groups without redundancy rely on external systems to maintain redundancy.

Enforcing data redundancy can be expensive. Storing data with normal redundancy consumes twice the overall disk space than storing data with no redundancy. Additional disks, higher capacity disks, and faster disks may need to be purchased and used in order to store the redundant copy or copies. Also, writing multiple copies consumes more bandwidth than writing a single copy. Writing multiple copies may take a considerable amount of extra time if there are not enough disks to support the writing in parallel. For example, in a well-balanced two-disk system, storing 2 GB of data without redundancy may involve storing half of the data on one disk and half of the data on the other disk, consuming a bandwidth of 1 GB for each disk. Storing 2 GB of data with redundancy would consume 2 GB of bandwidth in each of at least two failure groups. If the system is a two-disk system, then each failure group includes a single disk, and twice the amount of bandwidth per disk is consumed than in the system without redundancy. In this case, we would have to write 2 GB on each of two disks, for a total of 4 GB.

Despite the additional cost of data redundancy, database administrators often choose at least normal redundancy for disk groups in order to facilitate data recovery in the case of a disk failure. The mirrored copies are stored on separate failure groups so that one mirrored copy may be retrieved in case the failure group holding the other mirrored copy fails.

A disk group is a collection of disks that stores data for a database. For example, a disk group may store objects such as tables, relational tables, indexes, and object tables in a tablespace. A tablespace is a portion of the database, such as one or more data files, used to store database objects such as tables, columns, and indexes. For example, a tablespace may store two relational tables, an index, and an object table. Database metadata, which define database objects, also define what portions of a tablespace, such as segments and blocks, are used to store database object data.

A tablespace may be permanent or temporary. Permanent tablespaces are stored beyond the time boundaries of a session or transaction, and temporary tablespaces store temporary tables and temporary indexes that generally exist only for the duration of a user's session. For example, a temporary tablespace may be assigned to a user when the user establishes a database session. A temporary tablespace may be shared by multiple users or may be used by only a single user.

A tablespace may be created in a disk group with no redundancy, normal redundancy, or high redundancy. Data is maintained in the tablespace according to the redundancy level for the disk group. For example, two copies of the data are written to disk for every write operation performed to a tablespace in a normal redundancy disk group. Checksums and other error-checking techniques are used to detect errors in each of the mirrored copies. As long as there are no errors, read operations are performed by reading from only one of the mirrored copies.

When performing operations on large sets of data, such as in data warehousing, results of the operations are stored in a temporary tablespace on disk when the results do not fit in the available volatile memory. For example, if the temporary tablespace is stored with normal redundancy, then two copies of a result of the operation would be stored on disk. If the disk group containing the temporary tablespace fails, then the redundant copy is used to recover the result. If there is no redundant copy of the temporary tablespace, then the data stored in the temporary tablespace may be lost due to the disk failure.

Currently, redundant disk groups storing temporary tablespaces consume a large amount of resources to store redundant data on disk, a large amount of bandwidth for redundant write operations, and potentially a large amount of data I/O time for redundant write operations. On the other hand, disk groups storing temporary tablespaces without redundancy provide no protection against disk failure.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
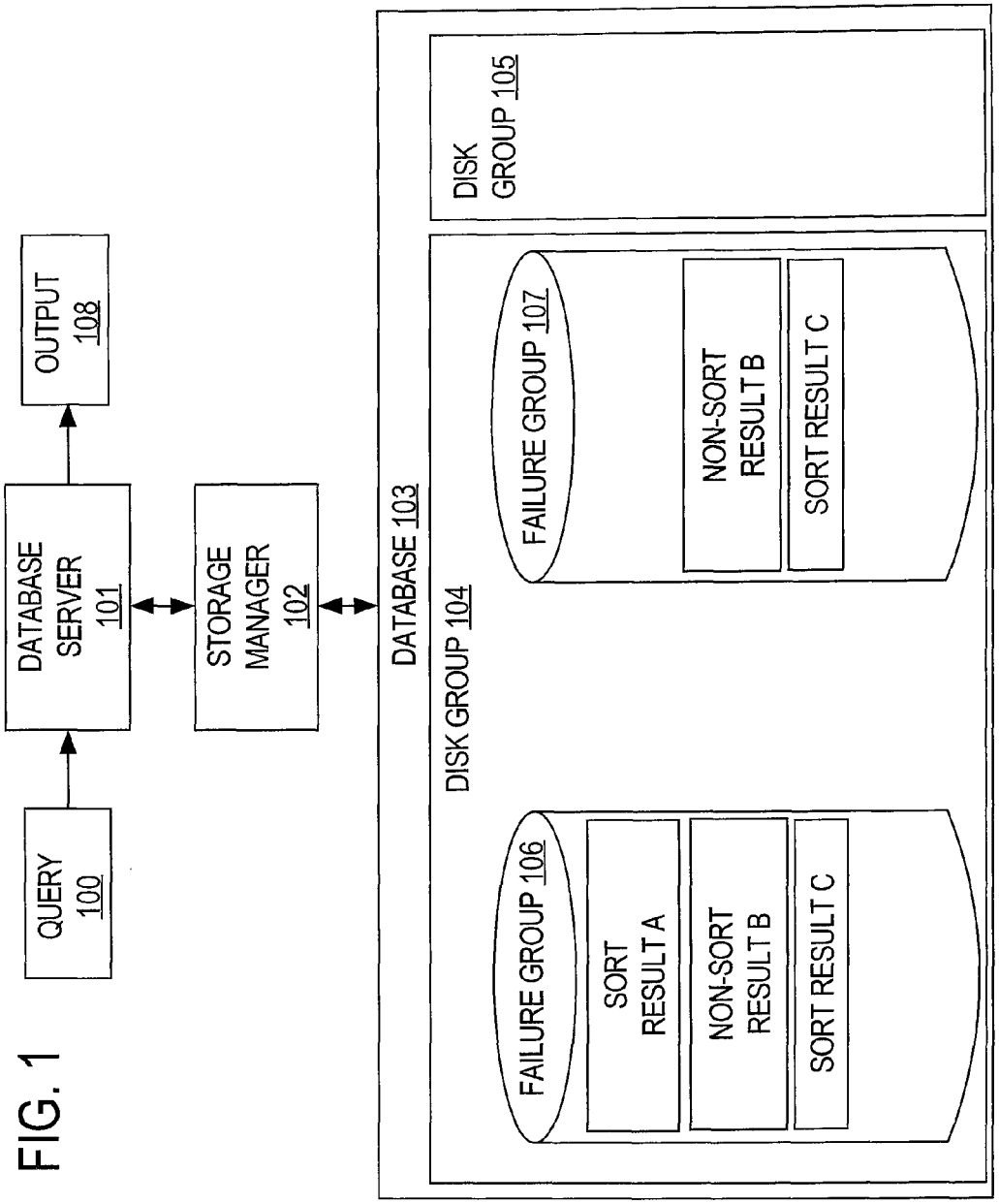
FIG. 1 is a diagram illustrating an example system in which a performance boost is provided for sort operations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Certain types of operations, such as sort operations that cannot be performed in memory, arrange data in a temporary space on disk without modifying values of the underlying data that is persistently stored in the database. In previous systems, data was stored in the temporary space according to a level of redundancy that was specified for the disk group from which the temporary space is allocated. In one embodiment described herein, a result is identified as a result of a sort operation, and the result is written to the temporary space as a single copy without redundancy even if redundancy is otherwise enforced for the disk group that contains the temporary space. For example, the result of the sort operation may be written to a single failure group even if there is more than one failure group in the system. In particular embodiments, a write to a redundant copy may be excluded or prevented before execution, interrupted during execution, or undone after execution if the write is associated with a sort operation.

Optionally, backup information sufficient to re-perform the sort operation is also written to the temporary space. In a particular embodiment, the backup information is written redundantly according to the level of redundancy for the disk group. If at least part of the result of the sort operation is lost due to disk failure, the sort operation may be executed again based on the backup information. A result of the sort operation executed after disk failure may be stored with or without the redundancy otherwise enforced for the disk group where the result is stored.

IDENTIFYING THE RESULT OF A SORT OPERATION

The techniques describes herein are not limited to any particular technique for identifying the result as a result of a sort operation. As a non-limiting example, a database instance performing the sort operation may provide an indication to a storage manager that the operation is a sort operation and/or that the result is to be stored without redundancy, even if redundancy is otherwise enforced on the disk group where the result is stored.

In one embodiment, a server such as a database instance receives a command to sort or arrange data, and a determination is made to store at least part of the result on disk. For example, the server may determine that there is only enough memory to store a first part of the result. The first part of the result may be computed and stored on disk, and then a second part of the result may be computed and stored on disk. In one example, the server may determine that there is not enough main memory allocated to the server to sort a set of rows according to an order by operation, a group by operation, a join operation, or a select unique operation. As the sort operation is performed using space allocated on disk, the server sends at least part of the result to a storage manager that manages a disk group where the disk space is allocated. The database server provides information to the storage manager which indicates that the operation is a sort operation and/or that the at least part of the result of the operation is to be stored without redundancy. In one embodiment, the information is stored in a manner that is accessible to the storage manager. In another embodiment, the information is sent to the storage manager with the at least part of the result.

In one embodiment, the server creates a tablespace designated to store temporary data, for example, results of sort operations and temporary objects such as temporary tables and temporary indexes. Alternatively, the server may use an existing temporary tablespace. The server receives a command to execute a sort operation that cannot be performed in memory. In one embodiment, the server selects a tablespace from a set of tablespaces used to store temporary information, for example, results of sort operations and temporary objects such as temporary tables and temporary indexes.

In a particular example, a mapping is shared between the storage manager and the server. The mapping identifies logical temporary tablespaces that are mapped to physical files identified by file identifiers. In one embodiment, one or more of the physical files are designated to store sort operations, and one or more other physical files may be used to store other information such as temporary tables and temporary indexes. In a particular embodiment, a range of file identifiers is designated for sort operations, and other file identifiers may be used for other types of operations. The server sends information to the storage manager that indicates that at least part of a result of the operation is to be stored on a physical file that is designated for sort operations. In a particular embodiment, the server chooses a temporary tablespace to store at least part of a result of the sort operation, and the server selects one or more file identifiers of physical files that are designated for sort operations.

The storage manager receives an instruction to perform an operation that cannot be performed in memory, and the storage manager identifies the operation as a sort operation. The storage manager may identify the operation as a sort operation based at least in part on data stored by the database server in association with the result, and/or based at least in part on data received with the result. Based on the information, the storage manager writes only one copy of the result to disk. In a specific example, the storage manager receives an instruction to write information to a file identifier in a tablespace. The storage manager determines that the tablespace is a temporary tablespace and the file identifier is within a range of file identifiers that are designated for sort operations. Based on the determination that the file identifier is within the range of file identifiers that are designated for sort operations, the storage manager writes a single copy of the data to disk.

In yet another embodiment, one or more storage devices are configured to identify the results of sort operations. In one embodiment, a storage device receives information, or meta-data, about the result which indicates that the result is from a sort operation. In another embodiment, the storage device accesses information stored in association with the result.

STORING RESULTS WITHOUT REDUNDANCY IN A REDUNDANT SYSTEM

According to the techniques described herein, a result may be identified as a result of a sort operation. In one embodiment, if the result is identified as a result of a sort operation, the result is written to only a single disk without enforcing the redundancy level of the disk group on which the result is stored. If the result is not identified as a result of a sort operation, the result is stored on the disk group according to the redundancy level of the disk group.

For example, a result of an operation may be 2 GB. As an example, the result is stored on a disk group with normal redundancy. If the result is not identified as the result of a sort operation, then the result takes up at least 4 GB on at least two disks in at least two failure groups. If the result is identified as the result of a sort operation, then the result takes up 2 GB and is stored on one or more disks in one or more failure groups. In a balanced two-disk system, the sort operation may be stored in parallel on both disks in the time it takes to store half of the data (1 GB) on one disk. On the other hand, a non-sort operation would be stored in the time it takes to store all of the data (2 GB) on each disk.

In the illustrative example of FIG. 1, a query 100 is received by a database server 101. Query 100 instructs database server 101 to perform operation A that arranges 2 GB of data, which the database server cannot perform in memory. Database server 101 uses a temporary tablespace in disk group 104 of database 103. As shown, database 103 includes disk groups 104 and 105. Disk group 104 enforces normal redundancy. The temporary tablespace is associated with a file identifier in a set of file identifiers designated for sort operations. Based on the file identifier, storage manager 102 identifies that operation A is a sort operation and stores only a single copy of the result of sort operation in disk group 104. As shown, the sort result A (2 GB) is stored in failure group 106.

As another illustrated example, database server 101 performs operation B to store 2 GB of data on disk as part of a non-sort operation. Because operation B is not a sort operation, storage manager 102 stores non-sort result B redundantly across failure groups 106 and 107. As shown, 2 GB of result B is stored on each of failure groups 106 and 107, for a total of 4 GB stored. When the operation completes, the database server may provide output 108, for example to a user, administrator, application, or another server.

In yet another illustrative example of FIG. 1, query 100 instructs database server 101 to perform operation C that arranges 2 GB of data, which the database server cannot perform in memory. Storage manager 102 identifies that operation C is a sort operation and stores only a single copy of the result of sort operation in disk group 104. As shown, half of sort result C (1 GB) is stored in each of failure groups 106 and 107. This method increases the data write bandwidth further as the writes are further distributed across disks in disk groups and failure group and can be written in parallel.

Figure 2:
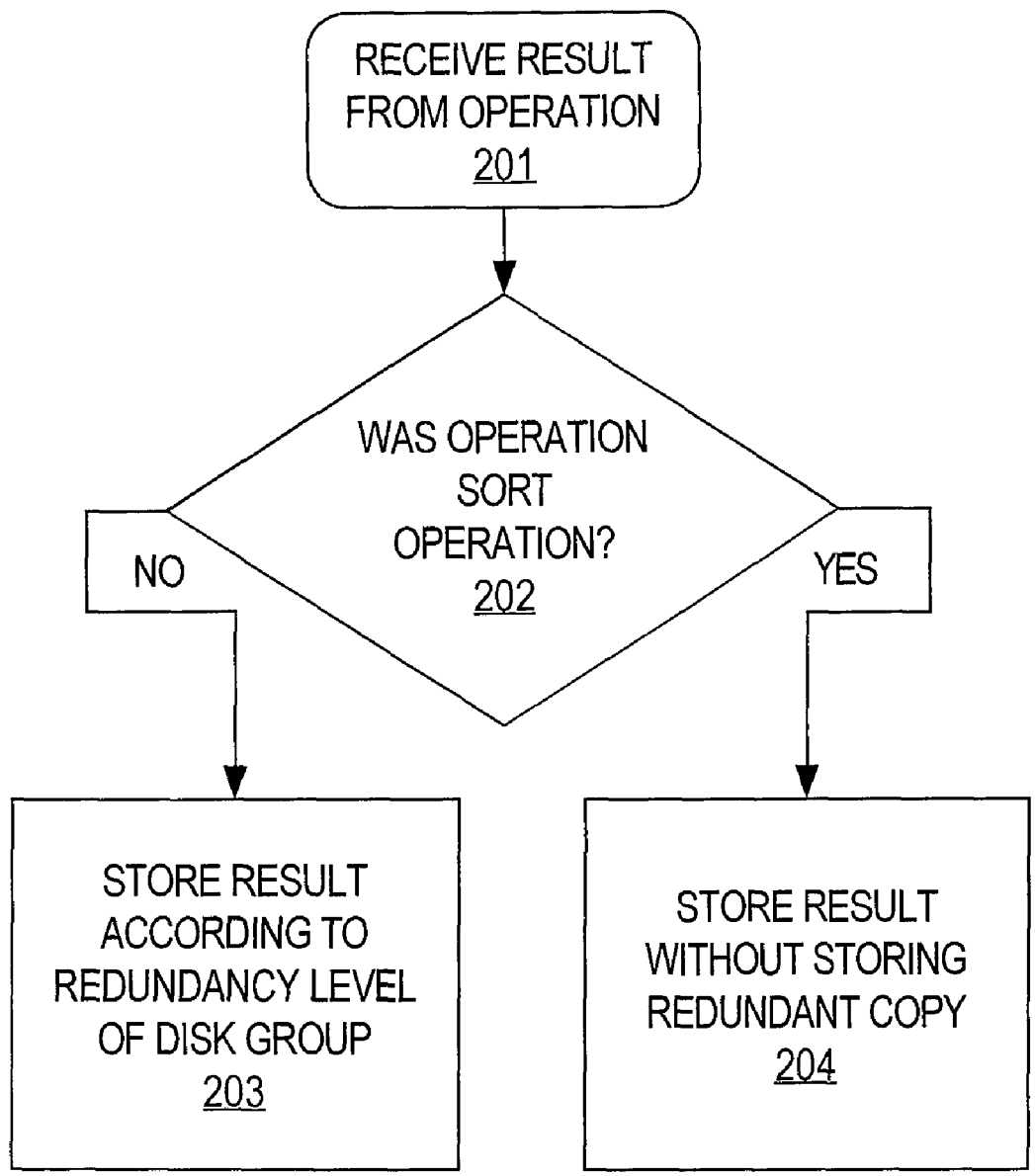
FIG. 2 is a decision diagram illustrating an example technique for providing a performance boost for sort operations.

FIG. 2 illustrates a decision model based on whether or not a result, or at least part of a result, to be stored is from a sort operation. In step 201, a result is received from, for example, a database server that performed an operation on a set of data in a database. In step 202, a determination is made as to whether the result is from a sort operation. If the result is not from a sort operation, then, in step 203, the result is stored according to the redundancy level of the disk group for which the result is stored. If the result is from a sort operation, then, in step 204, a single copy of the result is stored without storing a redundant copy of the result.

In various embodiments, a write to a redundant copy may be excluded or prevented before execution, interrupted during execution, or undone after execution if the write is associated with a sort operation. The write to a redundant copy may be excluded from write instructions to a disk. Alternatively, the write instructions may be prevented from writing to a redundant copy before being sent to the disk. A write that is completed or interrupted during execution may be undone when the result, or at least part of the result, is identified as the result of a sort operation. The write operation may be undone by removing the complete or partial redundant copy from disk. In one embodiment, space is de-allocated from the temporary tablespace in response to a determination that the space is not needed to store a copy of the result. In another embodiment, the unused space may remain available in the temporary tablespace. In one embodiment, a query operation interrupted while doing the sort operation caused by reasons other than disk failure behaves the same way as other interrupted query operations.

RECOVERING FROM DISK FAILURE

In one embodiment, a sort operation is interrupted due to disk failure while a sort operation is writing data in a non redundant fashion. Before the sort operation is interrupted, backup sufficient to re-perform the sort operation may be stored in memory or on disk. For example, backup information sufficient to re-perform the sort operation may be written to the temporary tablespace. In one embodiment, the backup information is stored on one or more storage devices that are not the storage devices used to store the result. By storing the backup information on a separate storage device, a failure of a storage device holding the result is not likely to cause a loss of the backup information. In another embodiment, the backup information is written redundantly according to the level of redundancy for the disk group.

The backup information may include an expression that, if executed by the database server, causes the sort operation to be re-performed. In a specific example, the expression may be an expression that was received by the database server to perform the initial sort operation. If the result, or at least part of the result, of the sort operation is lost due to disk failure, the sort operation is executed again by, for example, the database server, based on the backup information. A result of the sort operation executed after disk failure may be stored with or without the redundancy that is otherwise enforced for the disk group where the result is stored.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
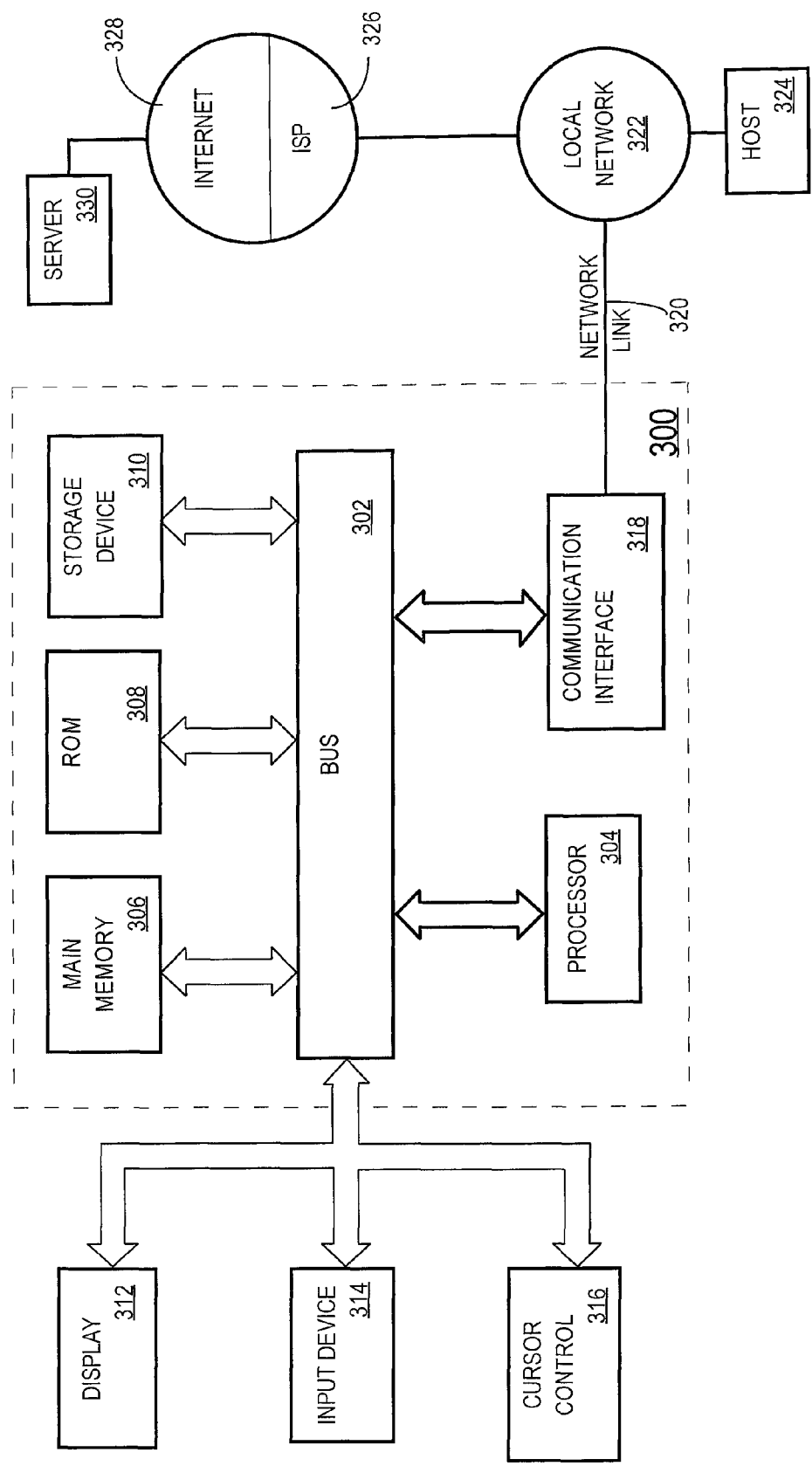
FIG. 3 is a diagram of a computer system upon which the techniques described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for storing data in temporary storage, wherein at least a portion of the data is stored redundantly, the method comprising:
receiving a first set of data to be stored in the temporary storage;
determining whether the first set of data resulted from a sort operation;
in response to determining that the first set of data did not result from the sort operation, redundantly storing the first set of data by storing both the first set of data and a copy of the first set of data in the temporary storage;
receiving a second set of data to be stored in temporary storage;

determining whether the second set of data resulted from the sort operation;

in response to determining that the second set of data did result from the sort operation, storing the second set of data in the temporary storage without storing any copies of the second set of data in the temporary storage;

wherein the method is performed by one or more computing devices.

2. The method of claim 1, wherein storing the second set of data without storing any copies of the second set of data in the temporary storage comprises consuming a particular amount of storage space in the temporary storage, and wherein storing the second set of data redundantly would have consumed twice the particular amount of storage space in the temporary storage.

3. The method of claim 1, wherein the first set of data resulted from a first operation performed by a database server, and wherein the second set of data resulted from a second operation performed by the database server, and wherein at least one of the first operation or the second operation is performed in response to a query for information from a database.

4. The method of claim 1, wherein the second set of data resulted from an operation performed by a database server, further comprising determining that the operation comprises writing the second set of data to a temporary tablespace.

5. The method of claim 4, wherein the second set of data resulted from an operation performed by a server, and wherein determining whether the second set of data resulted from the sort operation comprises determining that the operation is associated with a file identifier.

6. The method of claim 5, wherein the file identifier is in a set of file identifiers designated for sort operations.

7. The method of claim 1, wherein the second set of data is stored on a disk group where data redundancy is enforced.

8. The method of claim 1, wherein the second set of data resulted from an operation performed by a server, and wherein determining whether the second set of data resulted from the sort operation is based at least in part on information received from the server with the second set of data.

9. The method of claim 1, wherein the second set of data resulted from an operation performed by a server, and wherein determining whether the second set of data resulted from the sort operation is based at least in part on information stored by the server in association with the second set of data.

10. The method of claim 1, further comprising storing in the temporary storage backup information sufficient to re-perform the sort operation.

11. One or more volatile or non-volatile storage media storing instructions for causing data to be stored in temporary storage, wherein at least a portion of the data is stored redundantly, the instructions which, when executed by one or more computing devices, cause:

receiving a first set of data to be stored in the temporary storage;

determining whether the first set of data resulted from a sort operation;

in response to determining that the first set of data did not result from the sort operation, redundantly storing the first set of data by storing both the first set of data and a copy of the first set of data in the temporary storage;

receiving a second set of data to be stored in temporary storage;

determining whether the second set of data resulted from the sort operation;

in response to determining that the second set of data did result from the sort operation, storing the second set of data in the temporary storage without storing any copies of the second set of data in the temporary storage.

12. The one or more volatile or non-volatile storage media of claim 11, wherein storing the second set of data without storing any copies of the second set of data in the temporary storage comprises consuming a particular amount of storage space in the temporary storage, and wherein storing the second set of data redundantly would have consumed twice the particular amount of storage space in the temporary storage.

13. The one or more volatile or non-volatile storage media of claim 11, wherein the first set of data resulted from a first operation performed by a database server, and wherein the second set of data resulted from a second operation performed by the database server, and wherein at least one of the first operation or the second operation is performed in response to a query for information from a database.

14. The one or more volatile or non-volatile storage media of claim 11, wherein the second set of data resulted from an operation performed by a database server, further comprising determining that the operation comprises writing the second set of data to a temporary tablespace.

15. The one or more volatile or non-volatile storage media of claim 14, wherein the second set of data resulted from an operation performed by a server, and wherein determining whether the second set of data resulted from the sort operation comprises determining that the temporary tablespace is mapped to a file identifier.

16. The one or more volatile or non-volatile storage media of claim 15, wherein the file identifier is in a set of file identifiers designated for sort operations.

17. The one or more volatile or non-volatile storage media of claim 11, wherein the second set of data is stored on a disk group where data redundancy is enforced.

18. The one or more volatile or non-volatile storage media of claim 11, wherein the second set of data resulted from an operation performed by a server, and wherein determining whether the second set of data resulted from the sort operation is based at least in part on information received from the server with the second set of data.

19. The one or more volatile or non-volatile storage media of claim 11, wherein the second set of data resulted from an operation performed by a server, and wherein determining whether the second set of data resulted from the sort operation is based at least in part on information stored by the server in association with the second set of data.

20. The one or more volatile or non-volatile storage media of claim 11, wherein the instructions further cause storing in the temporary storage backup information sufficient to re-perform the sort operation.

* * * * *